Aug. 24, 1948.  G. W. COON  2,447,899
METHOD AND MEANS FOR DETECTING
FLAWS IN MAGNETIZABLE OBJECTS
Filed March 27, 1944  2 Sheets-Sheet 1

Inventor
GRANT W. COON.
by Charles H. Nills
Attys.

Aug. 24, 1948.   G. W. COON   2,447,899
METHOD AND MEANS FOR DETECTING
FLAWS IN MAGNETIZABLE OBJECTS
Filed March 27, 1944   2 Sheets-Sheet 2
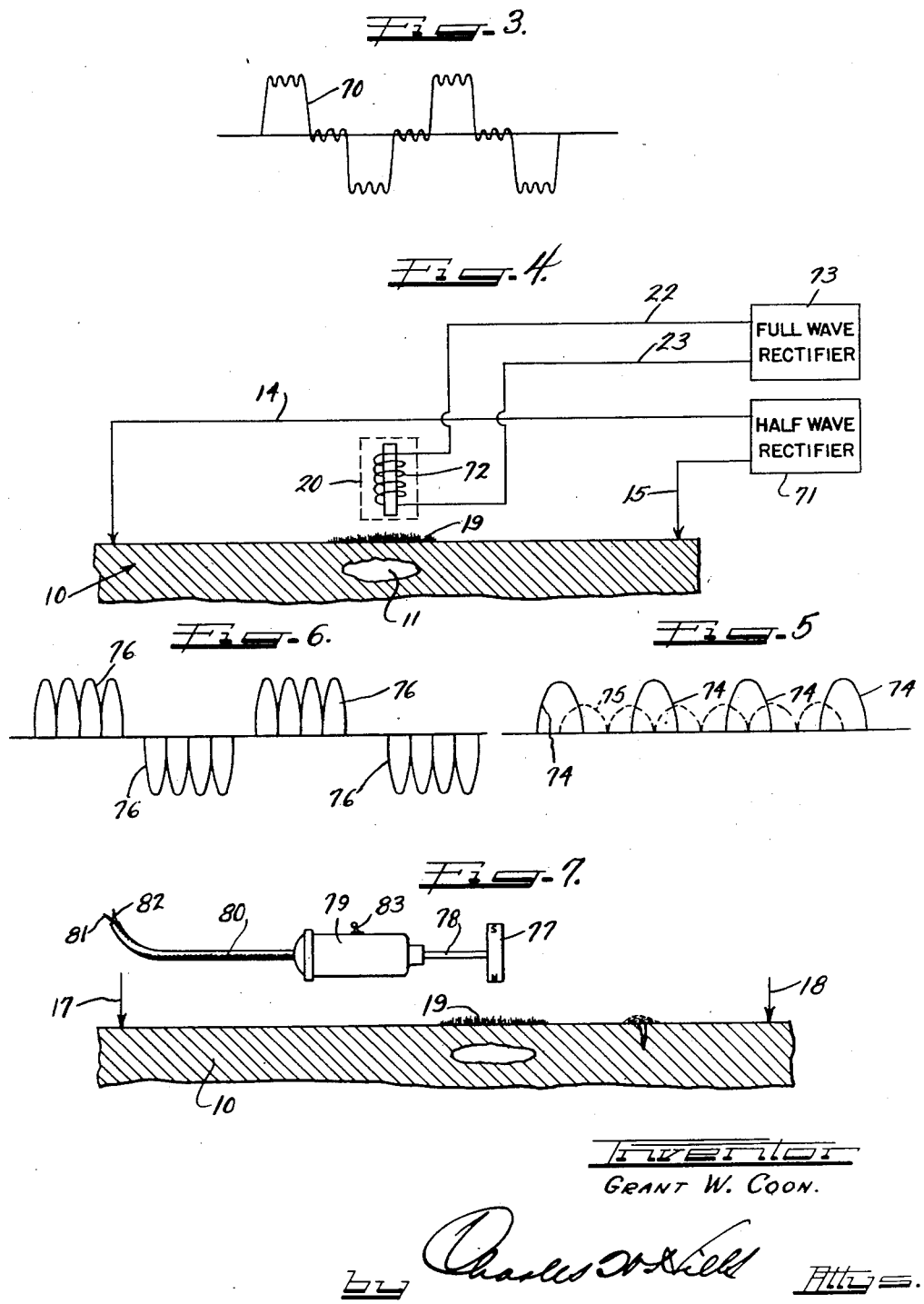
Inventor
Grant W. Coon.

Patented Aug. 24, 1948

2,447,899

UNITED STATES PATENT OFFICE 2,447,899

METHOD AND MEANS FOR DETECTING FLAWS IN MAGNETIZABLE OBJECTS

Grant W. Coon, Chicago, Ill., assignor to Magnaflux Corporation, Chicago, Ill., a corporation of Delaware Application March 27, 1944, Serial No. 528,202

10 Claims. (Cl. 175—183)

This invention relates to a method and means for detecting flaws in magnetizable objects, and more particularly to a novel method and means for locating surface and sub-surface defects in a paramagnetic object by magnetizing the object, dusting the same with paramagnetic particles, and subjecting the particles to the influence of an auxiliary magnetic field.

One of the principal methods of testing manufactured paramagnetic articles and other magnetizable metal objects for the presence of flaws such as minute surface cracks or sub-surface defects such as blow-holes, is to magnetize the object and then dust the surface of the same with paramagnetic particles. If there is any pronounced concentration of paramagnetic particles at any point on the surface, a flaw is indicated at that point. This is due to the fact that the leakage flux at the crack or defect causes a concentration of paramagnetic particles at that point. Since the test is negative in character (i. e., the absence of any congregation of paramagnetic particles being an indication that the article is free of flaws), it is extremely important that the object be properly magnetized and that the leakage flux be of sufficient strength as to cause a concentration of paramagnetic particles in the vicinity thereof. It is also important that the particles have sufficient mobility when attracted by a leakage flux to move over the surface to a point over the object. It has been difficult to use this method in the past where the defect is relatively broad, as distinct from a narrow fissure, such, for example, as defects due to blow-holes. It is believed that some of the difficulty experienced in this type of situation is due to the lack of mobility of the paramagnetic particles with which the surface is dusted. Other difficulties have been experienced in locating shrinkage cracks and hot tears due to the fact that the individual particles cannot sometimes bridge the gap or extend across the area of the leakage flux at the surface over such cracks and hot tears that lie beneath the surface.

One of the principal objects of the present invention is to provide a novel method and means for increasing the sensitivity of magnetic particle inspection equipment.

A further object of the present invention is to provide a novel method and means for increasing the mobility of paramagnetic particles employed in a magnetic particle inspection test.

Another object of the present invention is to provide a novel method and means to cause the paramagnetic particles to form stringers across the surface or sub-surface defect.

A still further object of the present invention is to provide a novel method and means for detecting relatively deep sub-surface defects such as blow-holes or hot tears.

Another and further object of the present invention is to provide novel magnetic particle inspection equipment in which auxiliary means is provided for agitating the paramagnetic particles as they are applied to the surface of a magnetized object to be tested.

Another and still further object of the present invention is to provide a novel paramagnetic particle applicator and a novel control and energization system therefor.

Still another and further object of the present invention is to provide a novel method and means for locating defects in magnetizable metal parts or objects.

One of the principal features of the present invention is to provide an auxiliary magnetizing field which is varied with respect to the main magnetizing field. When a magnetizable part or object is to be tested for a surface or sub-surface defect, the part is magnetized circularly by causing a relatively large current to pass through the part. If the part contains a defect such as a fissure or a blow-hole, a leakage field is produced above the defect. Paramagnetic powder, or particles, is sprinkled onto the surface of the part. A second magnetic field, applied above the powder, is caused to vary with respect to the main magnetizing field, which produces agitation, magnetization and partial lifting of the powder. This results in a more sensitive test and a greater accumulation of powder occurs above the defect in the part being tested. It has been found that the relative frequency of alternations or fluctuations of the main energization current should be low enough to obtain penetration of the magnetizing field and the relative auxiliary energization current should be low enough for the powder particles to shift positions and flop back and forth in response to the applied reversals of the field. It has further been found that higher frequencies are less desirable due to the fact that the powder particles cannot keep pace with the changing direction of the field.

The auxiliary fields may be varied relatively with respect to the main magnetizing field in many different manners without departing from the spirit and scope of the present invention. For example, the main magnetizing field may be obtained from a non-pulsating unidirectional current and the auxiliary field may be obtained from an alternating current, a pulsating unidirectional current, or a slowly reversing pulsating or steady unidirectional current. The main magnetizing field may be obtained from an alternating current energization circuit and an auxiliary field may be obtained from a unidirectional energization circuit. Still further, by way of example, the main magnetizing field may be obtained by a pulsating energization circuit and an auxiliary magnetizing field may be obtained by a unidirectional energization circuit, an alternating current energization circuit, or an out-of-phase pulsating unidirectional current.

The novel features which I believe to be characteristic of my invention are set forth with particularity in the appended claims. My invention itself, however, both as to its organization, manner of construction and method of operation, together with further objects and advantages thereof, can best be understood by reference to the following description taken in connection with the accompanying drawing, in which:

Figure 3 is a diagrammatic illustration of one type of resultant magnetizing field for the auxiliary magnetizing means which has been found to be particularly effective;

Figure 4 is a diagrammatic illustration of a modified form of the present invention;

Figure 5 is a diagrammatic illustration showing the relative phase relationship of the half-wave rectifier output as compared with the full wave rectifier output of the arrangement shown in Figure 6 of the drawings;

Figure 6 is a diagrammatic illustration of how the polarity of the output of the full wave rectifier of Figure 4 may be periodically reversed if desired; and Figure 7 is a diagrammatic illustration of a third embodiment of the present invention wherein paramagnetic particles are agitated by a rotating permanent magnet moved back and forth over the test piece when paramagnetic particles are applied thereto.

Figure 1:
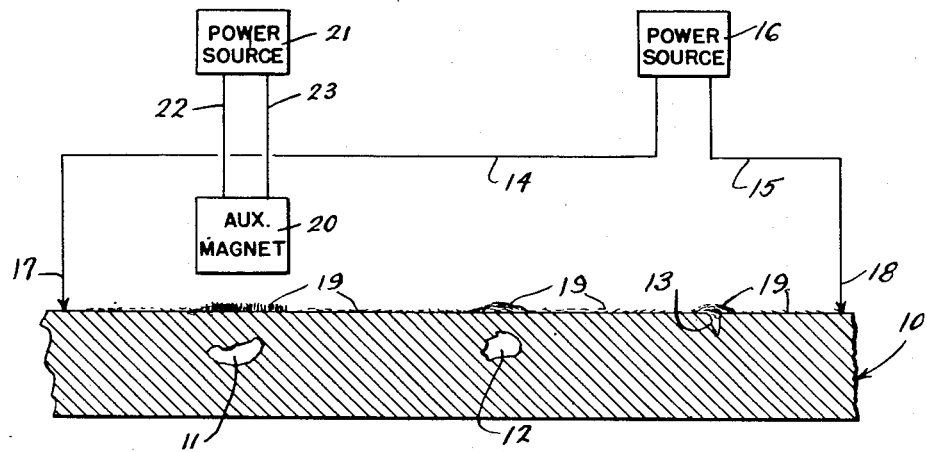
Figure 1 is a diagrammatic illustration of an object having both surface and sub-surface defects therein and being tested by the novel method and means of the present invention.

In Figure 1 a magnetizable object 10 is shown having two sub-surface defects 11 and 12 as well as a surface defect 13. In order to test the object 10 to determine whether there are any further defects therein the object 10 is magnetized through a main energization circuit indicated by the conductors 14 and 15 which are connected at one end to a source of electric power 16 and at the other end are connected in any suitable manner to spaced points on the test piece 10, as by means of contact prods diagrammatically indicated as at 17 and 18. Paramagnetic particles 19 are dusted over the surface of the object 10. Due to the change in permeability in the magnetic path of the flux set up by the electric current flowing through the test piece 10 at the defects 11, 12 and 13, a leakage flux occurs at each of these defects which tends to attract the paramagnetic particles 19 to the regions of the upper surface of the object 10 immediately over the defect. In order to increase the mobility of the paramagnetic particles 19 and facilitate their movement over the surface of the object 10 to the regions immediately over the defects 11, 12 and 13, the paramagnetic particles 19 are subjected to the influence of an auxiliary magnetic field established by the auxiliary magnetizing means 20. This auxiliary magnetizing means is energized from a suitable source of electric power indicated at 21 through conductors 22 and 23.

The auxiliary magnetizing means 20 is moved back and forth above the surface of the test piece 10. When the paramagnetic particles 19 are subjected to the influence of the auxiliary magnetic field they are caused to stand on end and wobble. This greatly reduces the friction of the paramagnetic particles on the surface of the test piece 10 and enables them to move more readily to the regions directly above the defects 11, 12 and 13. It has also been observed that the paramagnetic particles tend to form stringers which bridge the upper surface of a gap of a surface defect such as the surface defect 13, and also tends to form clusters which are more dense and more readily noted over any type of defect, whether a surface defect or a sub-surface defect.

In order that the above action may take place with maximum efficiency it is preferable that one of the two energization circuits derived from the power sources 16 and 21 periodically fluctuate or alternate with respect to the other. For example, the main energization circuit 14, 15 whose power is obtained from the power source 16, may be non-pulsating unidirectional current, while the power source 21 may supply alternating current to the auxiliary magnetizing means 20. When alternating current is supplied to the auxiliary magnetizing means 20 it is preferable that the frequency of alternation be relatively low in order to obtain the best results.

Instead of supplying alternating current to the auxiliary magnetizing means 20, pulsating unidirectional current may be supplied. The pulsating unidirectional current may be of constant polarity or may be periodically reversed after a number of pulsations in each direction.

When a slowly reversing pulsating or steady unidirectional current is employed particularly effective results have been obtained by superimposing an alternating current ripple component thereon.

It is to be understood that the current amplitude in the energization circuit of the auxiliary magnetizing means is relatively small with respect to the current amplitude of the main magnetizing circuit 14, 15.

Effective results have also been obtained by employing alternating current as the power source 16 and by employing unidirectional current as the power source 21.

It has also been found that the main magnetizing circuit may be energized from a power source having pulsating unidirectional current and by employing a power source 21 for the auxiliary magnetizing means which is unidirectional, alternating, pulsating or slowly reversing steady or pulsating unidirectional current, the pulsations being out of phase with the pulsating current supplied from the power source 16 to the main energization circuit 14, 15.

Figure 2:
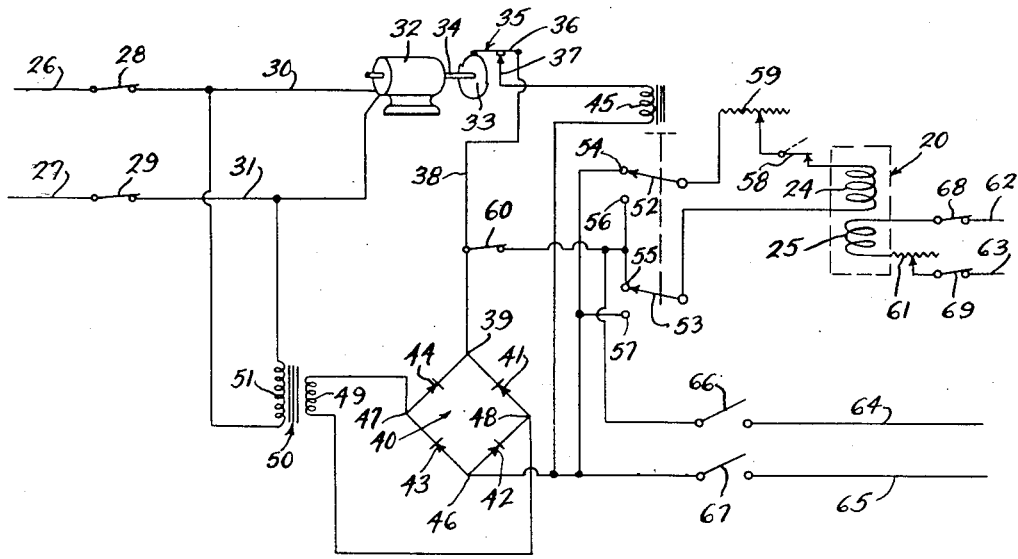
Figure 2 is a wiring diagram showing one form of circuit which may be employed as an energization circuit for establishing the auxiliary magnetic field.

In order to better illustrate and describe the present invention there is shown in Figure 2 one type of circuit arrangement which may be employed to great advantage when the power source 16 is non-pulsating unidirectional current. The circuit of Figure 2 represents the energization circuit for the auxiliary magnetizing means 20 of Figure 1. The auxiliary magnetizing means 20 shown in Figure 2 includes two magnetizing coils 24 and 25. The coil 24 is energized in the following manner: A pair of power supply conductors 26 and 27 are connected to a suitable source of alternating current. These power supply conductors are connected through switches 28 and 29 and conductors 30 and 31 to a small timer motor 32 having a cam disk 33 mounted on the rotating armature shaft 34 thereof. The cam disk 33 is so shaped as to periodically open and close a switch 35 having a movable contact 36 and a stationary contact 37. The movable contact 36 is connected through a conductor 38 to the corner 39 of a full-wave dry rectifier bridge 40 having four rectifiers 41, 42, 43 and 44 in each of the four arms thereof. The stationary contact 37 of the switch or relay 35 is connected through a contactor solenoid 45 to the corner 46 of the rectifier bridge 40. The remaining two corners 47 and 48 of the rectifier bridge 40 are connected to the opposite ends of the secondary winding 49 of a transformer 50. The transformer 50 has its primary winding 51 connected to the supply conductors 30 and 31.

The contactor solenoid 45 is arranged to operate the movable switch arms 52 and 53 in such a manner that when the solenoid 45 is energized the contact arms 52 and 53 are in engagement with stationary contacts 54 and 55 respectively, and when the solenoid 45 is deenergized the contact arms 52 and 53 are in engagement with stationary contacts 56 and 57 respectively.

The magnetizing coil 24 is connected to the movable contact arms 52 and 53 through a switch 58 and a rheostat 59. The stationary contact 56 and the stationary contact 55 are connected through a switch 60 to the point 39 of the rectifier bridge 40. The stationary contact 54 and the stationary contact 57 are connected to the point 46 of the rectifier bridge 40. It will thus be apparent that when the movable contact arms 52 and 53 are in engagement with the stationary contacts 54 and 55, unidirectional current from the rectifier 40 flows in one direction through the magnetizing coil 24, and when the movable contacts 52 and 53 are in engagement with the stationary contacts 56 and 57 the unidirectional current from the rectifier bridge 40 flows through the magnetizing coil 24 in the opposite direction. The reversal of direction of flow of pulsating unidirectional current through the magnetizing coil 24 depends upon whether the contacting coil 45 is energized or not. Since this coil is periodically energized through the switch 35 under control of the timer driven cam 33 it is apparent that the direction of flow of current through the magnetizing coil 24 depends upon the state of energization of the contact coil 45. The timer motor 32 is preferably driven at a speed such that several pulsations of unidirectional current will flow through the magnetizing coil 24 in one direction, then as the contacts 52 and 53 shift positions no current flows for a short period of time, and then as the new contact is made with stationary contacts 56 and 57 a number of pulsations will flow through the coil 24 in the opposite direction.

The second coil 25 of the auxiliary magnetizing means 20 is connected through a variable resistance 61 to a source of alternating current represented by the power supply conductors 62 and 63. The intensity of the current supplied to the coil 25 and the frequency of alternations is such as to put a small effective ripple component on the magnetic field resulting from the auxiliary magnet combination 20.

The power supply conductors 64 and 65 are arranged to be connected to a battery or other power supply and are connected through the switches 66 and 67 to contacts 56 and 55 on the one hand and contacts 54 and 57 on the other hand respectively. When the switches 66 and 67 are closed the switch 60 is opened but switches 28 and 29 remain closed if the polarity of the power source is to be reversed; or switches 28 and 29 may be opened if it is desired that current shall flow uninterrupted through coil 24 from power supply conductors 64 and 65. The magnetizing coil 25 may be disconnected from the power supply conductors 62 and 63 by opening switches 68 and 69, if no superimposed ripple is desired.

Figure 3 of the drawings illustrates the wave form 70 of the resulting magnetic field obtained from the auxiliary magnetizing unit 20 when the power supply conductors 64 and 65 are connected to a storage battery or other equivalent source, and with switches 28, 29, 66, 67, 68 and 69 closed, and with switch 60 open.

Figure 6 of the drawings illustrates the wave form 76 of the resulting magnetic field of the auxiliary magnetizing unit 20 when switches 28, 29 and 60 are closed and when switches 66, 67, 68 and 69 are open. A ripple may of course be superimposed on the wave form shown in Figure 6 by simply closing switches 68 and 69.

In the embodiment of the invention illustrated in Figure 4 of the drawings, the main magnetizing circuit 14, 15 is energized from a half-wave rectifier 71. The auxiliary magnetizing means 20 includes a magnetizing coil 72 energized through the conductors 22 and 23 from a full-wave rectifier 73. The phase of the current output from the full-wave rectifier 73 is preferably about 90° out of phase with respect to the current supplied from the half-wave rectifier 71. This is diagrammatically illustrated in Figure 5 wherein the current supplied in the energizing circuit 14, 15 from the half-wave rectifier 71 is represented by the half-wave pulsations 74 while the current supplied from the full-wave rectifier 73 is represented by the pulsations 75. It will be noted that the peaks of the half-wave pulsations 74 occur at zero points of the full-wave rectifier pulsations 75.

A third embodiment of the present invention is illustrated in Figure 7 of the drawings, wherein the auxiliary magnetizing means for wobbling the paramagnetic particles 19 is provided by a permanent magnet 77 which is mounted on the armature shaft 78 of a small electric motor 79. The electric motor 79 is energized through a suitable cable 80 having conductors 81 and 82 therein. A small hand switch 83 is also provided for turning the motor 79 on and off. This unit, including the hand motor 79 and the permanent magnet 77, is passed slowly back and forth over the test piece 10 for the purpose of increasing the mobility of the paramagnetic particles 19 and causing the same to wobble. The motor driven magnet 77 has the effect of providing a reversing magnetic field over the paramagnetic particles. The contact parts 17 and 18 of the main magnetization circuit are preferably connected to a source of non-pulsating unidirectinal current.

The foregoing description of certain illustrated embodiments of the present invention serve to illustrate the method and means by which greater sensitivity is obtained for testing magnetizable bodies with paramagnetic particles. It is believed that the greatly improved results are obtained through the use of a relatively weak auxiliary magnetizing field moved above the surface of the magnetized objects due to the following facts: Mobility is imparted to the particle by having a relatively low frequency fluctuating or alternating field. The paramagnetic particles are believed to be magnetized with the induced field from the auxiliary magnetizing means which tends to increase the sensitivity of the power. The inertia and gravitational forces acting on the powder are reduced due to the upward pull of the magnetic field established by the auxiliary magnetizing means. This, in effect, means that the auxiliary magnetizing means is believed to have the effect of increasing the magnetic attraction of the paramagnetic particles to the leakage field, while at the ame time, the mass of the particles, is, in effect, reduced. In connection with its application for detecting deep sub-surface leakage fields, it is to be remembered that such leakage fields are relatively broad with a low magnetic gradient. The powder particles, unders such circumstances, may be too short to brridge the gap in the leakage field.

With the method and means above described, banding of the powder takes place forming what amounts to longer particles or stringers able to bridge the boundaries of the leakage field. Particles employed for magnetic particle inspection tests are usually needle-shaped particles. The present method and means may have the effect of improving the particle shape by forming stringers which increases the longitudinal to the transverse axis of the particle shape.

The value of the auxiliary magnetic field must be some value below that which will pull the powder away from the part. That value of field strength can be obtained either by varying the distance of the magnet from the part or by varying the current amplitude.

While I have shown certain particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. The method of testing a magnetizable body for surface and sub-surface defects which includes magnetizing the body by passing a relatively heavy electric magnetizing current through said body, dusting the body with paramagnetic particles, and subjecting the particles to the influence of a relatively weak auxiliary magnetic field, the main magnetic field of the magnetized object being non-pulsating and unidirectional, and the auxiliary magnetic field being a periodically reversing pulsating field.

2. The method of testing a magnetizable body for surface and sub-surface defects which includes magnetizing the body by passing a relatively heavy electric magnetizing current through said body, dusting the body with paramagnetic particles, and subjecting the particles to the influence of a relatively weak auxiliary magnetic field, the main magnetic field being a pulsating unidirectional field and the auxiliary magnetic field being a pulsating unidirectional field out of phase with respect to said main pulsating magnetic field.

3. The method of testing a magnetizable body for surface and sub-surface defects which includes magnetizing the body by passing a relatively heavy electric magnetizing current through said body, dusting the body with paramagnetic particles, and subjecting the particles to the influence of a relatively weak auxiliary magnetic field, the main magnetic field being a pulsating unidirectional field and the auxiliary magnetic field being a periodically reversed pulsating magnetic field.

4. The method of testing a magnetizable body for surface and sub-surface defects which includes magnetizing the body by passing a relatively heavy electric magnetizing current through said body, dusting the body with needle shaped paramagnetic particles, and subjecting the particles to the influence of a relatively weak auxiliary magnetic field, at least one of said fields being a periodically reversing pulsating field.

5. Means for agitating paramagnetic particles disposed on the surface of a magnetized object comprising means for establishing a pulsating unidirectional field, and means for periodically reversing the direction of said field.

6. Means for agitating paramagnetic particles disposed on the surface of a magnetized object comprising means for establishing a pulsating unidirectional field, means for periodically reversing the direction of said field, and means for superimposing a relatively weak reversing field on said first field.

7. Means for agitating paramagnetic particles disposed on the surface of a magnetized object comprising a magnetizing coil, a pair of power supply conductors arranged to be connected to a source of alternating current, rectifier means, means for connecting said coil to said power supply conductors through said rectifier means, a switch means for reversing the direction of current flow through said coil, and means for periodically operating said switch means to reverse the direction of current flow through said coil.

8. Means for agitating paramagnetic particles disposed on the surface of a magnetized object comprising a magnetizing coil, a pair of power supply conductors arranged to be connected to a source of alternating current, full wave rectifier means, means for connecting said coil to said power supply conductors through said rectifier means, switch means for reversing the direction of current flow through said coil, a relay for controlling the operation of said switch means, and timer means for periodically energizing said relay.

9. Means for agitating paramagnetic particles disposed on the surface of a magnetized object comprising a magnetizing coil, a pair of power supply conductors arranged to be connected to a source of alternating current, full wave rectifier means, means for connecting said coil to said power supply conductors through said rectifier means, switch means for reversing the direction of current flow through said coil, a relay for controlling the operating of said switch means, timer means for periodically energizing said relay, a second magnetizing coil disposed adjacent said first magnetizing coil, and means for energizing said second coil with a relatively weak alternating current.

10. The method of testing a magnetizable body for surface and sub-surface defects which includes magnetizing the body, testing the body with paramagnetic particles and subjecting the particles to the combined influence of an auxiliary magnetic field having a wave form comprised of spaced pulsations whose polarity is intermittently reversed, and with a substantially higher frequency continuously alternating magnetic field of relatively weaker intensity superimposed thereon.

GRANT W. COON.

REFERENCES CITED

The following references are of record in the file of this patent:

UNITED STATES PATENTS

| Number | Name | Date |
|---|---|---|
| 1,293,912 | Parter | Feb. 11, 1919 |
| 1,782,462 | Chappuzeau et al. | Nov. 25, 1930 |
| 2,061,692 | Bagley | Nov. 24, 1936 |
| 2,110,759 | De Forest | Mar. 8, 1938 |
| 2,158,409 | De Forest et al. | May 16, 1939 |
| 2,217,733 | De Forest | Oct. 15, 1940 |
| 2,242,366 | Muller | May 20, 1941 |
| 2,258,274 | Betz | Oct. 7, 1941 |
| 2,277,431 | Fitch | Mar. 24, 1942 |
| 2,337,148 | Barnes | Dec. 21, 1943 |